(12) United States Patent
Chung

(10) Patent No.: US 9,356,459 B2
(45) Date of Patent: May 31, 2016

(54) METHOD FOR CHARGING BATTERY AND ELECTRONIC DEVICE THEREOF

(71) Applicant: Samsung Electronics Co. Ltd., Suwon-si, Gyeonggi-do (KR)

(72) Inventor: Myung-Kyoon Chung, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 360 days.

(21) Appl. No.: 13/888,710

(22) Filed: May 7, 2013

(65) Prior Publication Data

US 2014/0002008 A1    Jan. 2, 2014

(30) Foreign Application Priority Data

Jul. 2, 2012    (KR) .................... 10-2012-0071964

(51) Int. Cl.
*H02J 7/00* (2006.01)
*H02J 7/04* (2006.01)

(52) U.S. Cl.
CPC ............. *H02J 7/0057* (2013.01); *H02J 7/0022* (2013.01); *H02J 7/0042* (2013.01); *H02J 7/0073* (2013.01)

(58) Field of Classification Search
CPC ...... H02J 7/0073; H02J 7/0057; H02J 7/0042
USPC ......................................... 320/107, 133, 155
See application file for complete search history.

(56) References Cited

U.S. PATENT DOCUMENTS

| 5,666,039 | A  | * | 9/1997 | Odaohara et al. ............. 320/152 |
| 5,808,447 | A  | * | 9/1998 | Hagino ................. H02J 7/0036 320/139 |
| 5,900,717 | A  | * | 5/1999 | Lee ................. 320/150 |
| 5,909,101 | A  | * | 6/1999 | Matsumoto ............. H02J 7/047 320/110 |
| 6,064,179 | A  | * | 5/2000 | Ito et al. ......................... 320/128 |
| 7,109,684 | B2 | * | 9/2006 | Takaoka et al. ............... 320/132 |
| 7,449,862 | B1 | * | 11/2008 | Voor et al. ..................... 320/107 |
| 7,612,536 | B2 | * | 11/2009 | Hoffer et al. ................. 320/133 |
| 8,004,237 | B2 | * | 8/2011 | Manor et al. .................. 320/114 |
| 8,269,468 | B2 | * | 9/2012 | Ju ......................... H02J 7/0072 320/150 |
| 9,225,178 | B2 | * | 12/2015 | Chishima ................ H02J 7/045 |
| 2011/0175569 | A1 | * | 7/2011 | Austin ................ B60L 11/1824 320/109 |
| 2012/0019193 | A1 | * | 1/2012 | Yu et al. ........................ 320/103 |
| 2013/0030593 | A1 | * | 1/2013 | Gao ........................ G06F 1/26 700/297 |
| 2014/0300313 | A1 | * | 10/2014 | Nishiwaki ............... H02J 7/025 320/108 |

FOREIGN PATENT DOCUMENTS

KR    10-2009-0109146 A    10/2009

* cited by examiner

*Primary Examiner* — M'Baye Diao
(74) *Attorney, Agent, or Firm* — Jefferson IP Law, LLP

(57) ABSTRACT

An apparatus and method for charging a battery of an electronic device are provided. In the method, when the battery is fully charged, charging of the battery is suspended. When a predetermined time elapses from a point at which the battery has been fully charged, the charging of the battery is resumed.

20 Claims, 7 Drawing Sheets

METHOD FOR CHARGING BATTERY AND ELECTRONIC DEVICE THEREOF

PRIORITY

This application claims the benefit under 35 U.S.C. §119 (a) of a Korean patent application filed on Jul. 2, 2012 in the Korean Intellectual Property Office and assigned Serial No. 10-2012-0071964, the entire disclosure of which is hereby incorporated by reference.

BACKGROUND OF THE INVENTION

1. Field of the Invention

The present invention relates to an electronic device. More particularly, the present invention relates to an apparatus and method for charging a battery of an electronic device.

2. Description of the Related Art

Recently, as electronic devices such as a smart phone, a tablet Personal Computer (PC), etc. develop rapidly, an electronic device that can perform wireless voice communication and information exchange has become a daily necessity. In its early stages, an electronic device was simply recognized as a portable device that could perform wireless communication. However, as technology developed and as the wireless Internet was introduced, the electronic device evolved from merely a portable device that could perform wireless communication into a multimedia device able to perform functions of schedule management, games, a remote controller, image shooting, etc. to fulfill a user's desire.

As the electronic device has evolved to include additional functions, the use time and capacity of the battery that supplies power to the electronic device have also increased. Since an amount of consumption of the battery increases as a use time and a use capacity of the battery increase, a user of the electronic device must frequently charge the battery or charges the battery for a long time. For example, the user of the electronic device frequently goes to bed with the electronic device connected with a charger. At this point, the electronic device repeats a cycle of fully charging the battery, recharging the battery when a current is consumed, and recharging the battery when the current is consumed again. This charging method charges the battery by an amount of a consumed current when the current for charging the battery of the electronic device is consumed. Since this charging method unnecessarily wastes current and repeats charging and discharging of the battery, this charging method shortens the life of the battery. Therefore, an apparatus and method for efficiently charging a battery in an electronic device need to be provided.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and method for charging a battery in an electronic device.

Another aspect of the present invention is to provide an apparatus and method for fully charging a battery initially in an electronic device, suspending battery charging, and resuming the battery charging based on a time set in advance.

Another aspect of the present invention is to provide an apparatus and method for preventing charging and discharging of the battery from being repeated in an electronic device.

Another aspect of the present invention is to provide an apparatus and method for controlling battery charging by controlling a switch device for connecting an external input terminal for being supplied with charging power with a battery in an electronic device.

In accordance with an aspect of the present invention, a method for charging a battery in an electronic device is provided. The method includes, when the battery is fully charged, suspending charging of the battery, and, when a predetermined time elapses from a point at which the battery has been fully charged, resuming the charging of the battery, wherein the electronic device assumes that it is being supplied with power for charging.

In accordance with another aspect of the present invention, an electronic device for charging a battery is provided. The electronic device includes one or more processors, the battery, and a memory, wherein when the battery is fully charged, the one or more processors suspends charging of the battery, and when a predetermined time elapses from a point at which the battery has been fully charged, the one or more processors resumes the charging of the battery, and wherein the electronic device assumes that it is being supplied with power for charging.

In accordance with still another aspect of the present invention, an electronic device for charging a battery is provided. The electronic device includes one or more processors, the battery, a memory, and one or more programs stored in the memory and configured for being executed by the one or more processors, wherein the one or more programs includes instructions for suspending charging of the battery when the battery is fully charged, and, when a predetermined time elapses from a point at which the battery has been fully charged, resuming the charging of the battery, and wherein the electronic device assumes that it is being supplied with power for charging.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, an electronic device is descriptive of a mobile communication terminal, a smart phone, a tablet PC, a digital camera, an MP3 player, a laptop computer, a Netbook, a portable game console or similar devices that may include and can charge a battery.

Figure 1:
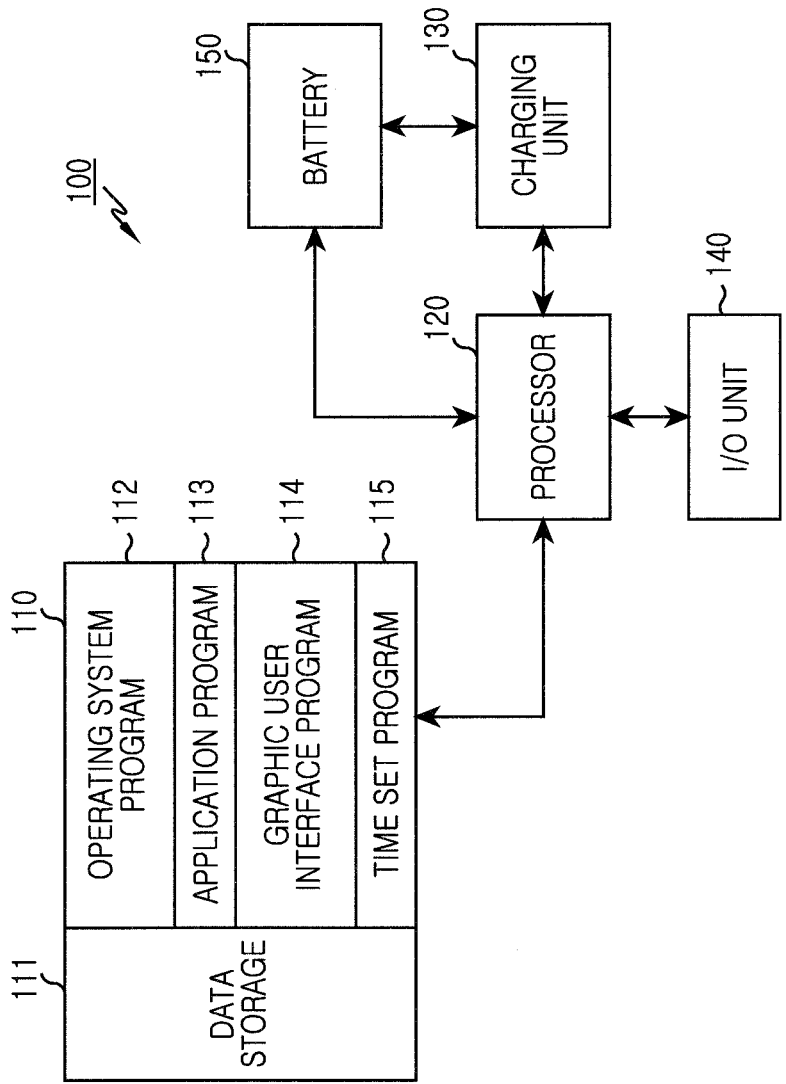
FIG. 1 is a block diagram illustrating an electronic device for charging a battery according to an exemplary embodiment of the present invention.

FIG. 1 is a block diagram illustrating an electronic device for charging a battery according to an exemplary embodiment of the present invention.

Referring to FIG. 1, the electronic device 100 includes a memory 110, a processor 120, a charging unit 130, an Input/Output (I/O) unit 140, and a battery 150. The memory 110 and the processor 120 may include a plurality of memories 110 and a plurality of processors 120, respectively.

The memory 110 includes a data storage 111, an operating system program 112, an application program 113, a graphic user interface program 114, a time set program 115, etc. Also, since a program which is a software element may be expressed in terms of a set of instructions, the program may be expressed as an instruction set. A program may be also expressed as a module.

The memory 110 may store one or more programs including instructions for performing an embodiment of the present invention.

The data storage 111 may store data generated during an operation of the electronic device 100. The data storage 111 may store a charge resume time set by the time set program 115. At this point, the charge resume time denotes a time at which temporarily suspended charging of the battery 150 resumes after the battery 150 is fully charged. For example, the data storage 111 may store a time corresponding to a half hour before an alarm time set at the electronic device as the charge resume time.

The operating system program 112 (for example, WINDOWS, LINUS, Darwin, RTXC, UNIX, OS X, or a built-in operating system such as a VxWorks) includes various software elements for controlling a general system operation. For example, the control of the general system operation denotes memory management and control, storage hardware (device) control and management, power control and management, etc. The operating system program 112 performs a function of smoothing communication between various hardware (devices) and software elements (programs).

The application program 113 includes applications such as a browser, an electronic (e)-mail, a message, a word processor, an address book, a widget, a Digital Right Management (DRM), voice recognition, voice duplication, a position determining function, a location based service, an alarm, etc.

The graphic user interface program 114 includes at least one software element for providing a graphical user interface between a user and the electronic device 100. That is, the graphic user interface program 114 includes at least one software element for displaying user interface information on the I/O unit 140. For example, the graphic user interface program 114 controls to display a screen for receiving a charge resume time or an alarm time from a user on the I/O unit 140. For another example, the graphic user interface program 114 controls to display an alarm application execute screen on the I/O unit 140. For still another example, when charging of the battery 150 is temporarily suspended after the battery 150 is fully charged, the graphic user interface program 114 controls to display information indicating that the charging of the battery 150 has been temporarily suspended until the charging of the battery 150 resumes.

When full charge of the battery 150 is detected by the charging unit 130, the time set program 115 detects a time at which the battery 150 has been fully charged. Also, the time set program 115 receives the charge resume time from the user and stores the received charge resume time in the memory 110. The charge resume time may be a time the user directly inputs to resume the charging or a time earlier by a predetermined time than an alarm time input by the user. Here, the alarm time denotes a time for generating an alarming sound, a vibration, or an alarm message for a morning call, a schedule, etc. For example, in the case where the alarm time is nine o'clock, the charge resume time may be eight thirty which is a half before the alarm time.

After that, the time set program 115 calculates a time difference between a detected current time and the charge resume time input by the user. For example, in the case where the charge resume time input by the user is 10:00 pm and a time at which full charge of the battery 150 has been detected by the charging unit 130 is 3:00 pm, the time set program 115 calculates a time difference between the current time and the charge resume time is 7 hours. For another example, in the case where a current time at which full charge of the battery 150 has been detected by the charging unit 130 is 10:00 pm and an alarm time input by the user is 08:00 am of the next day, the time set program 115 determines the charge resume time as 07:30 am and calculates a time difference between 10:00 pm, which is the current time, and 07:30 am, which is the charge resume time, is 9 hours 30 minutes.

After the battery 150 is fully charged, when a time elapses by the calculated time difference, the time set program 115 controls the charging unit 130 to resume charging of the battery 150.

Though not shown, the processor 120 may include at least one processor and a peripheral interface. Also, the processor 120 executes a specific program (instruction set) stored in the memory 110 to perform a plurality of specific functions corresponding to the program.

When the battery 150 is fully charged initially, the charging unit 130 suspends the charging of the battery 150, and when a charge resume time arrives, the charging unit 130 restarts the charging of the battery 150. In other words, when the battery 150 is fully charged initially, the charging unit 130 suspends the charging of the battery 150 and then does not resume the charging of the battery 150 until the charge resume time arrives even when consumption of the battery 150 is detected. At this point, the initial full charge of the battery 150 denotes a state where after a voltage is input from an external interface and an operation of charging the battery 150 starts, a charging capacity of the battery 150 reaches 100 percent initially.

The I/O unit 140 includes an input unit that can receive data and an output unit that can output data. The I/O unit 140 also provides an interface to a user. For example, the I/O unit 140 may be a touchscreen that can input and output data simultaneously. The I/O unit 140 may receive the charge resume time from the user, and when the charge resume time arrives, the I/O unit 140 may selectively output a message representing the charging starts again to the user.

Figure 2:
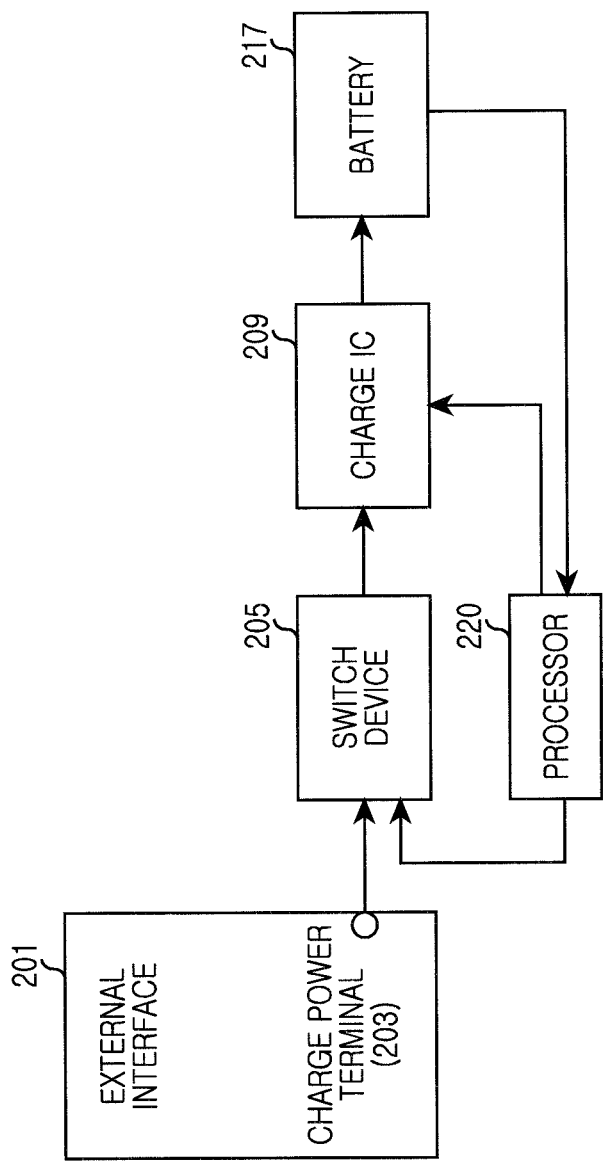
FIG. 2 is a block diagram illustrating a charging circuit for charging a battery in an electronic device according to an exemplary embodiment of the present invention.

FIG. 2 is a block diagram illustrating a charging circuit for charging a battery in an electronic device according to an exemplary embodiment of the present invention.

Referring to FIG. 2, the charging circuit includes an external interface 201, a switch device 205, a processor 220, a charge Integrated Circuit (IC) 209, and a battery 217. Here, the external interface 201, the switch device 205, and the charge IC 209 may be included in the charging unit 130 of FIG. 1.

The external interface 201 includes a charge power terminal 203 and supplies a voltage input from an external charger to the switch device 205 via the charge power terminal 203.

The switch device 205 supplies a voltage input from the charge power terminal 203 to the charge IC 209 or cuts off the voltage under control of the processor 220. That is, when a charge suspend signal is input from the processor 220, the switch device 205 releases an electrical connection between the charge power terminal 203 and the charge IC 209 to cut off supplying of the voltage from the charge power terminal 203 to the charge IC 209. Also, when a charge resume signal is input from the processor 220, the switch device 205 connects the charge power terminal 203 with the charge IC 209 to allow the voltage supplied from the charge power terminal 203 to be supplied to the charge IC 209.

When full charge of the battery 217 is detected, the processor 220 outputs a charge suspend signal to the switch device 205 for connecting the external interface 201 with the charge IC 209, and the charge IC 209. Also, the processor 220 determines the charge resume time, and when the charge resume time arrives, the processor 220 outputs a charge resume signal to the switch device 205 for connecting the external interface 201 with the charge IC 209, and the charge IC 209.

The charge IC 209 converts an input voltage to a charge voltage and a charge current suitable for the electronic device 100 and supplies the same to the battery 217.

Figure 3A:
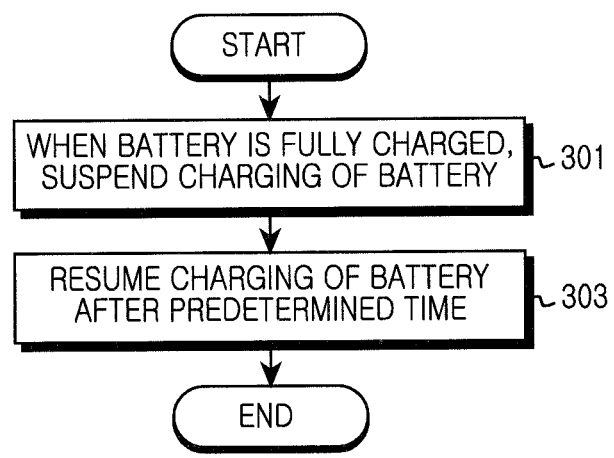
FIG. 3A is a flowchart illustrating a procedure for charging a battery in an electronic device according to an exemplary embodiment of the present invention.

FIG. 3A illustrates a procedure for charging a battery in an electronic device according to an exemplary embodiment of the present invention.

Referring to FIG. 3A, when the battery is fully charged, the electronic device suspends charging of the battery in step 301.

After that, the electronic device proceeds to step 303 to resume the charging of the battery after a predetermined time. In other words, when charge completion of the battery is detected, the electronic device cuts off power introduced from an external charger to the battery until the charge resume time arrives. At this point, the predetermined time denotes a time difference between a time at which the battery has been fully charged and the charge resume time.

Figure 6:
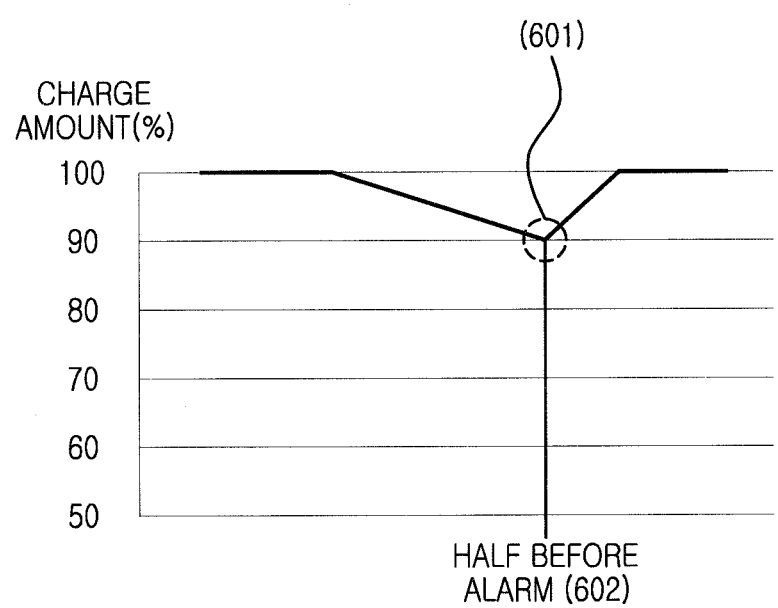
FIG. 6 is a graph illustrating a charge capacity of a battery that resumes charging based on an alarm time in an electronic device according to an exemplary embodiment of the present invention.

FIG. 6 is a graph illustrating a charge capacity of a battery that resumes charging based on an alarm time in an electronic device according to an exemplary embodiment of the present invention.

Referring to FIG. 6, when an amount of charge of the battery reaches 100 percent, the electronic device suspends charging of the battery. After that, the electronic device maintains a charge suspend state even when an amount of charge of the battery is reduced to 90 percent 601 due to current consumption of the electronic device. When a charge resume time set to a half hour before an alarm time 602 arrives, the electronic device resumes the charging of the battery to allow the charge of the battery to reach 100 percent again.

Figure 3B:
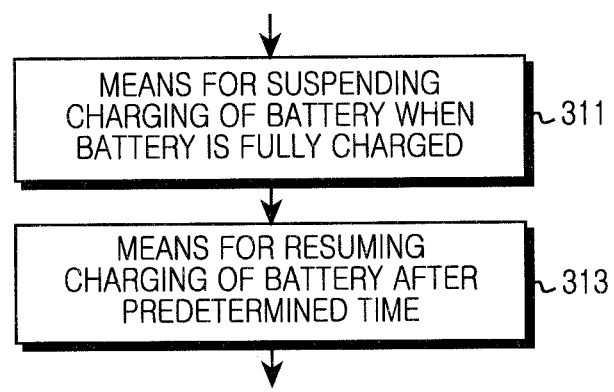
FIG. 3B is a view illustrating a device for charging a battery in an electronic device according to an exemplary embodiment of the present invention.

FIG. 3B illustrates a device for charging a battery in an electronic device according to an exemplary embodiment of the present invention.

Referring to FIG. 3B, the electronic device includes means 311 for suspending charging of the battery when the battery is fully charged, and means 313 for resuming charging of the battery after a predetermined time. Additionally, the electronic device may include means for supplying power from an external charger to the battery or for cutting off the power.

Figure 4:
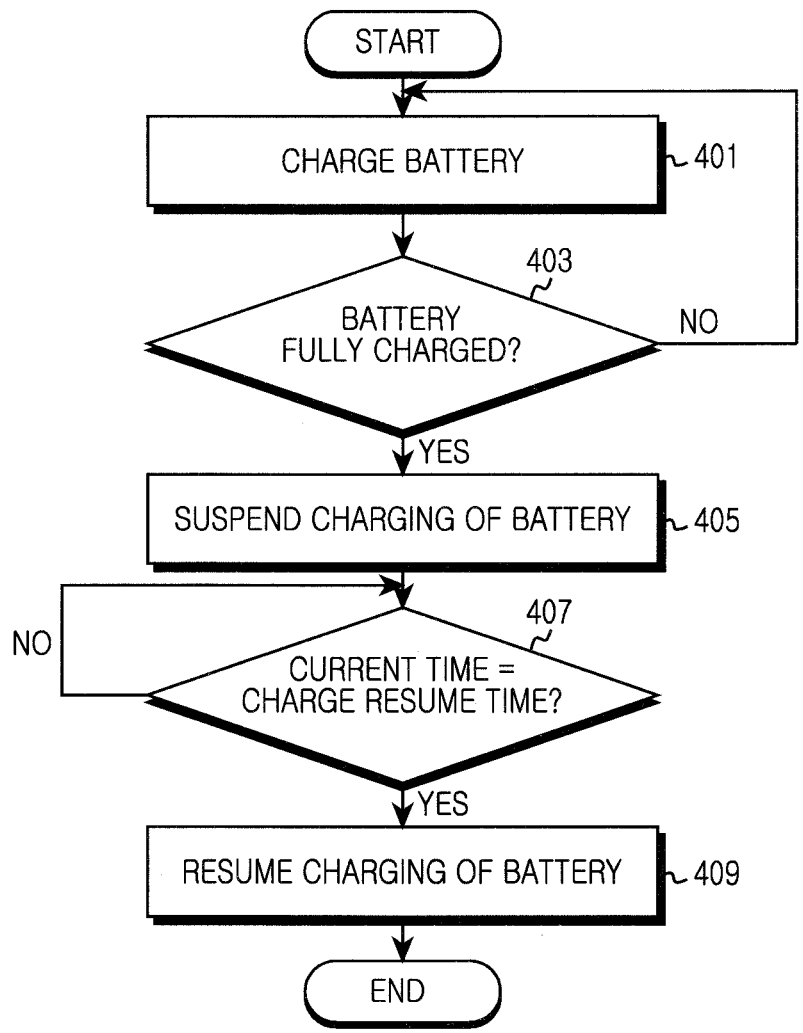
FIG. 4 is a flowchart illustrating a procedure for resuming battery charging after a predetermined time in an electronic device according to an exemplary embodiment of the present invention.

FIG. 4 illustrates a procedure for resuming battery charging after a predetermined time in an electronic device according to an exemplary embodiment of the present invention.

Referring to FIG. 4, the electronic device charges the battery in step 401, and proceeds to step 403 to determine whether the battery has been fully charged. In the case where the battery is not fully charged, the electronic device returns to step 401 to re-perform subsequent steps.

When the battery is fully charged, the electronic device proceeds to step 405 to suspend charging of the battery. At this point, the electronic device may suspend charging of the battery by turning off a switch device for connecting an external interface with the battery, and a charge IC to cut off power provided to the battery.

After that, the electronic device determines whether a current time coincides with a charge resume time in step 407. At this point, the charge resume time denotes a time for restarting the suspended charging of the battery, and the charge resume time may be a time directly input by a user or a time earlier by a predetermined time than an alarm time input by the user. For example, in the case where the alarm time is nine o'clock, the charge resume time may be eight thirty, which is earlier by 30 minutes than the alarm time.

In the case where the current time does not coincide with the charge resume time, the electronic device re-performs step 407 until the current time coincides with the charge resume time.

In contrast, in the case where the current time coincides with the charge resume time, the electronic device proceeds to step 409 to resume the charging of the battery. At this point, the electronic device turns on the switch device for connecting the external interface with the battery, and the charge IC to allow external power to be provided to the battery. For example, in the case where a charge resume time is 8:30 pm and a current time is 8:30 pm, the electronic device restarts the charging of the battery. For another example, in the case where an alarm time is 5:00 pm, the electronic device determines the charge resume time is 04:30 and restarts the charging of the battery at 4:30 pm. After that, the electronic device ends the procedure according to an exemplary embodiment of the present invention.

Though not shown in FIG. 4, an exemplary electronic device according to the present invention may selectively receive a charging method from a user before step 401 to fully charge the battery, and then suspend the charging of the battery and resume the charging of the battery at a charge resume time, or, as in the conventional method, the electronic device may fully charge the battery and then instantly charge a consumed current again when the current is consumed.

Figure 5:
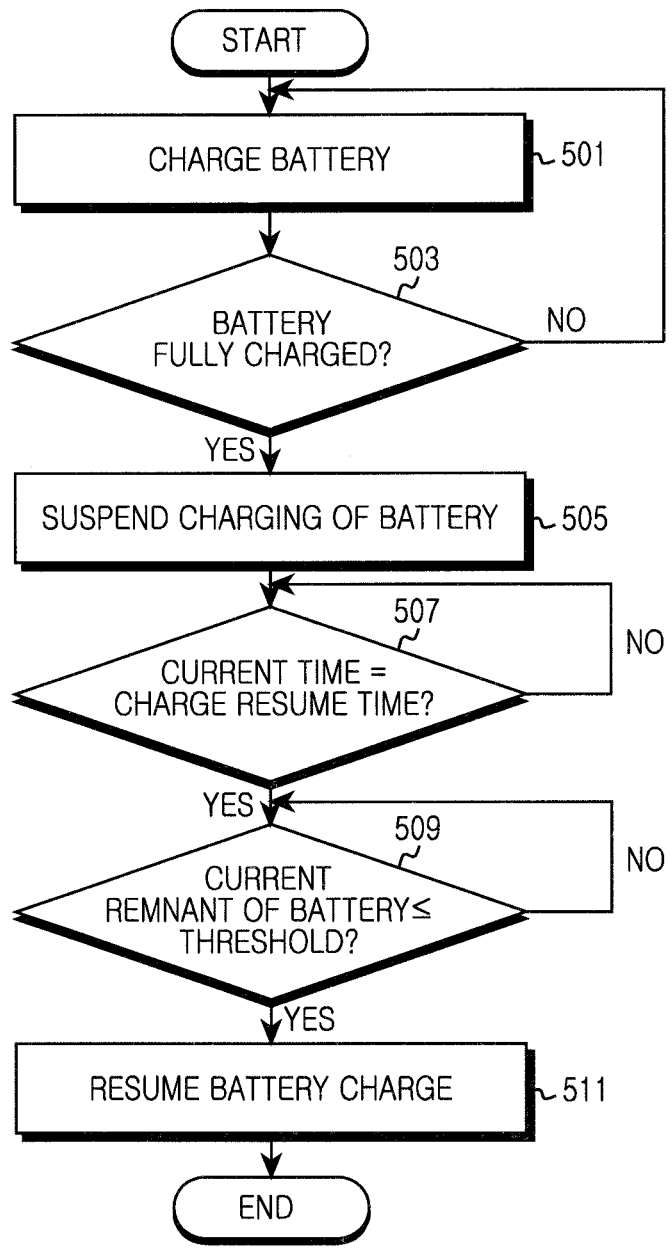
FIG. 5 is a flowchart illustrating a procedure for resuming battery charging with consideration of a time and a remaining charge of the battery in an electronic device according to an exemplary embodiment of the present invention.

FIG. 5 illustrates a procedure for resuming battery charging with consideration of a time and a remaining charge of the battery in an electronic device according to an exemplary embodiment of the present invention.

Referring to FIG. 5, the electronic device charges the battery in step 501 and proceeds to step 503 to determine whether the battery has been fully charged. In the case where the battery is not fully charged, the electronic device returns to step 501 to re-perform the subsequent steps.

In the case where the battery is fully charged, the electronic device proceeds to step 505 to suspend the charging of the battery. At this point, the electronic device may suspend the charging of the battery by turning off a switch device for connecting the external interface with the battery, and a charge IC to cut off power introduced to the battery.

After that, the electronic device determines whether a current time coincides with a charge resume time in step 507. At this point, the charge resume time denotes a time for restarting the suspended charging of the battery, and the charge resume time may be a time directly input by a user or a time earlier by a predetermined time than an alarm time input by the user. For example, in the case where an alarm time is nine o'clock, the charge resume time may be eight thirty, which is earlier by 30 minutes than the alarm time.

In the case where the current time does not coincide with the charge resume time, the electronic device determines a charge unallowable state and re-performs step 507 until the current time coincides with the charge resume time.

In contrast, when the current time coincides with the charge resume time, the electronic device determines a charge allowable state and proceeds to step 509 to determine whether a remaining charge of the battery is equal to or less than a threshold. In other words, the electronic device determines whether the remaining charge of the battery of the electronic device is equal to or less than the threshold set in advance. At this point, the threshold may be set in advance during a design stage or set and changed by a user.

In the case where the remaining charge of the battery is greater than the threshold, the electronic device re-performs step 509 until the remaining charge of the battery is equal to or less than the threshold.

In contrast, in the case where the remaining charge of the battery is equal to or less than the threshold, the electronic device proceeds to step 511 to resume the charging of the battery, and then ends the procedure according to an exemplary embodiment of the present invention. For example, in the case where the remaining charge of the battery is 80 percent and the threshold is 80 percent, the electronic device restarts the charging. At this point, the current time may a time same as the charge resume time or a time that has elapsed the charge resume time. That is, in the case where the current time is the same as the charge resume time or has elapsed the charge resume time, when the remaining charge of the battery is equal to or less than the threshold, the electronic device may resume the charging of the battery.

Though the exemplary embodiment of the present invention describes a method of comparing the current time with the charge resume time, and comparing the remaining charge of the battery with the threshold in the case where the current time coincides with the charge resume time, a method of comparing the remaining charge of the battery with the threshold in step 507 first and comparing the current time with the charge resume time in the case where the remaining charge of the battery is equal to or less than the threshold may be possible depending on a design scheme.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for charging a battery of an electronic device, the method comprising:
   receiving power for charging the battery;
   charging the battery using the received power;
   determining whether the battery is fully charged;
   in response to determining that the battery is fully charged, suspending the charging of the battery;
   determining whether a predetermined time elapses from a point at which the battery has been fully charged;
   suspending the charging of the battery until the predetermined time is elapsed; and
   in response to determining that the predetermined time is elapsed, resuming the charging of the battery.

2. The method of claim 1, wherein the suspending of the charging of the battery comprises:
   controlling a switching operation of a switch device positioned between an input terminal for receiving external power and a charge Integrated Circuit (IC) to cut off power received from the input terminal to the charge IC.

3. The method of claim 1, wherein the resuming of the charging of the battery comprises:
   controlling a switching operation of a switch device positioned between an input terminal for receiving external power and a charge Integrated Circuit (IC) to supply power from the input terminal to the charge IC.

4. The method of claim 1, wherein, when the predetermined time elapses, the resuming of the charging of the battery comprises:
   calculating a time difference between a time at which the battery has been fully charged and a charge resume time set in advance; and
   when a time corresponding to the calculated time difference elapses, resuming the charging of the battery.

5. The method of claim 1, wherein, when the predetermined time elapses, the resuming of the charging of the battery comprises:
   detecting a predetermined alarm time;
   determining a charge resume time based on the detected alarm time;
   calculating a time difference between a time at which the battery has been fully charged and the charge resume time; and
   when a time corresponding to the calculated time difference elapses, resuming the charging of the battery.

6. The method of claim 5, wherein the determining of the charge resume time based on the detected alarm time comprises:
   determining a time earlier by a predetermined time than the detected alarm time as the charge resume time.

7. The method of claim 1, wherein, when the predetermined time elapses, the resuming of the charging of the battery comprises:
when the predetermined time elapses, determining whether a remaining charge of the battery is equal to or less than a predetermined threshold; and
when the remaining charge of the battery is equal to or less than the predetermined threshold, resuming the charging of the battery.

8. An electronic device for charging a battery, the electronic device comprising:
one or more processors;
the battery; and
a memory,
wherein the one or more processors is supplied with power for charging the battery, charges the battery using the supplied power, determines whether the battery is fully charged, suspends the charging of the battery in response to determining that the battery is fully charged, determines whether a predetermined time elapses from a point at which the battery has been fully charged, suspends the charging of the battery until the predetermined time is elapsed, resumes the charging of the battery in response to determining that the predetermined time is elapsed, and the electronic device assumes that it is being supplied with power for charging.

9. The electronic device of claim 8, further comprising:
a switch device for connecting an input terminal for being supplied with external power with a charge Integrated Circuit (IC),
wherein the one or more processors cuts off power supplied from the input terminal to the charge IC by controlling a switching operation of the switch device in order to suspend the charging of the battery.

10. The electronic device of claim 8, further comprising:
a switch device for connecting an input terminal for being supplied with external power with a charge Integrated Circuit (IC),
wherein the processor supplies power from the input terminal to the charge IC by controlling a switching operation of the switch device in order to resume the charging of the battery.

11. The electronic device of claim 8, wherein the processor calculates a time difference between a time at which the battery has been fully charged and a predetermined charge resume time, and when a time corresponding to the calculated time difference elapses, resumes the charging of the battery.

12. The electronic device of claim 8, wherein the processor detects a predetermined alarm time, determines a charge resume time based on the detected alarm time, calculates a time difference between a time at which the battery has been fully charged and a predetermined charge resume time, and resumes the charging of the battery when a time corresponding to the calculated time difference elapses.

13. The electronic device of claim 12, wherein the processor determines a time earlier by a predetermined time than the detected alarm time as the charge resume time.

14. The electronic device of claim 8, wherein, when the predetermined time elapses, the processor determines whether a remaining charge of the battery is equal to or less than a predetermined threshold, and, when the remaining charge of the battery is equal to or less than the predetermined threshold, the processor resumes the charging of the battery.

15. An electronic device for charging a battery, the electronic device comprising:
one or more processors;
the battery;
a memory; and
one or more programs stored in the memory and configured for being executed by the one or more processors,
wherein the program comprises instructions for receiving power for charging the battery, charging the battery using the supplied power, determining whether the battery is fully charged, suspending the charging of the battery in response to determining that the battery is fully charged, determining whether a predetermined time elapses from a point at which the battery has been fully charged, suspends the charging of the battery until the predetermined time is elapsed, resuming the charging of the battery in response to determining that the predetermined time is elapsed, and the electronic device assumes that it is receiving power for charging.

16. The electronic device of claim 15, further comprising:
a switch device for connecting an input terminal for receiving external power with the battery,
wherein the program cuts off power supplied from the input terminal to the battery by controlling a switching operation of the switch device and a charge Integrated Circuit (IC) in order to suspend the charging of the battery.

17. The electronic device of claim 15, further comprising:
a switch device for connecting an input terminal for receiving external power with the battery,
wherein the program supplies power from the input terminal to the battery by controlling a switching operation of the switch device and a charge Integrated Circuit (IC) in order to resume the charging of the battery.

18. The electronic device of claim 15, wherein the program calculates a time difference between a time at which the battery has been fully charged and a predetermined charge resume time, and when a time corresponding to the calculated time difference elapses, resumes the charging of the battery.

19. The electronic device of claim 15, wherein the program detects a predetermined alarm time, determines a charge resume time based on the detected alarm time, calculates a time difference between a time at which the battery has been fully charged and a predetermined charge resume time, and resumes the charging of the battery when a time corresponding to the calculated time difference elapses, and
the charge resume time comprises a time earlier by a predetermined time than the detected alarm time.

20. The electronic device of claim 15, wherein, when the predetermined time elapses, the program determines whether a remaining charge of the battery is equal to or less than a predetermined threshold, and, when the remaining charge of the battery is equal to or less than the predetermined threshold, the program resumes the charging of the battery.

* * * * *